(12) United States Patent
Wu et al.

(10) Patent No.: US 10,845,687 B2
(45) Date of Patent: Nov. 24, 2020

(54) OPTICAL ENGINE MODULE AND PROJECTOR HAVING THE SAME

(71) Applicant: Qisda Corporation, Taoyuan (TW)

(72) Inventors: Po-Fu Wu, New Taipei (TW);
Hung-Jen Wei, Nantou (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/733,717

(22) Filed: Jan. 3, 2020

(65) Prior Publication Data

US 2020/0241402 A1 Jul. 30, 2020

(30) Foreign Application Priority Data

Jan. 24, 2019 (CN) .......................... 2019 1 0065600

(51) Int. Cl.
| | |
|---|---|
| *G03B 21/16* | (2006.01) |
| *H04N 9/31* | (2006.01) |
| *G02B 6/42* | (2006.01) |
| *G03B 21/14* | (2006.01) |
| *G03B 21/22* | (2006.01) |

(52) U.S. Cl.
CPC .............. *G03B 21/16* (2013.01); *G02B 6/42* (2013.01); *G03B 21/142* (2013.01); *G03B 21/22* (2013.01); *H04N 9/3144* (2013.01)

(58) Field of Classification Search
CPC ........ G03B 21/14; G03B 21/16; G03B 21/22; G03B 21/005; G03B 21/006; G03B 21/008; H04N 9/31; H04N 9/3144

USPC .............................................. 353/52, 57, 61
See application file for complete search history.

(56) References Cited

U.S. PATENT DOCUMENTS 9,456,188 B2   9/2016   Miyata et al.
9,952,487 B2 *  4/2018   Lin .................... G03B 21/16

FOREIGN PATENT DOCUMENTS

CN        105388689 A     3/2016
JP        11-93670 A      3/2016

* cited by examiner

*Primary Examiner* — William C. Dowling

(57) ABSTRACT

An optical engine module and a projector having the same are provided. The optical engine module includes an optical engine housing having a sound outlet, a light modulation unit disposed in the optical engine housing, and a heat dissipation tube disposed on the optical engine housing at an outer side of the optical engine housing and configured to dissipate heat from the optical engine housing. The heat dissipation tube communicates with the sound outlet. Noise is generated when the light modulation unit is operated. The noise travels from the sound outlet into the heat dissipation tube and is reflected back through the heat dissipation tube to the sound outlet to form a reflected sound wave, and the heat dissipation tube has a length enabling the reflected sound wave and the noise to have a phase difference of 180 degrees.

12 Claims, 6 Drawing Sheets

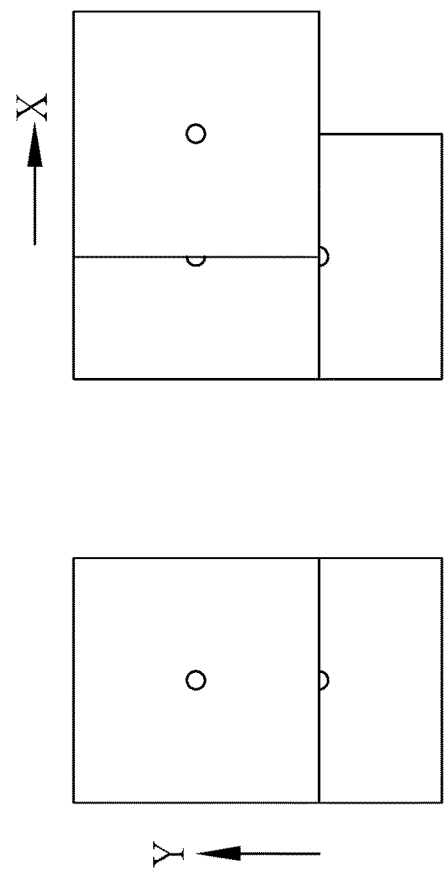
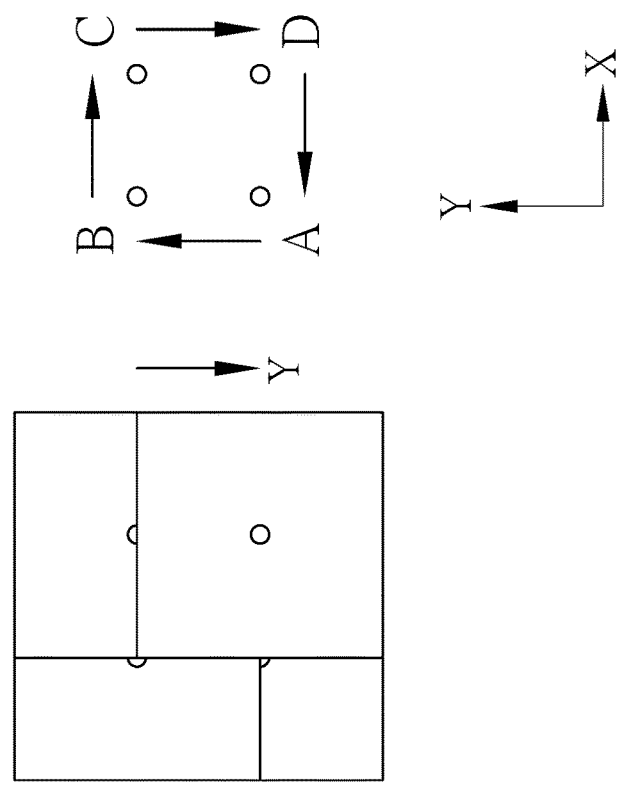
FIG. 3A  FIG. 3B  FIG. 3C  FIG. 3D

OPTICAL ENGINE MODULE AND PROJECTOR HAVING THE SAME

BACKGROUND OF THE INVENTION

1. Field of the Invention

The invention generally relates to an optical engine module.

Particularly, the invention relates to an optical engine module with an integrated heat dissipation and noise reduction design and a projector having the same.

2. Description of the Prior Art

The imaging principle of a projector is to generate light by a light source, and to modulate the light into light signals of multiple colors through an optical-engine system, and then through optical elements (such as mirrors, lenses, etc.) and an imaging-forming component (such as DMD, LCD), the colored light signal is converted into an image signal, which is projected on the screen or wall surface through a lens to form an image. However, the optical engine system usually includes components (such as color wheels, actuating elements, etc.) that generate heat and/or noises during operation. Especially when the optical engine system is integrated to the optical engine housing into a modular form, the operation quality of the projector is not only limited by the heat dissipation of the optical engine module, but also the noises, which are amplified due to the speaker effect in the optical engine housing, further seriously affecting the operation quality of the projector.

SUMMARY OF THE INVENTION

It is an object of the invention to provide an optical engine module having a heat dissipation tube designed for heat dissipation and noise reduction.

In an embodiment, the invention provides an optical engine module for a projector. The optical engine module includes an optical engine housing having a sound outlet, a light modulation unit disposed in the optical engine housing, and a heat dissipation tube disposed on the optical engine housing at an outer side of the optical engine housing and configured to dissipate heat from the optical engine housing, the heat dissipation tube communicating with the sound outlet, wherein noise is generated when the light modulation unit is operated; the noise travels from the sound outlet into the heat dissipation tube and is reflected back through the heat dissipation tube to the sound outlet to form a reflected sound wave, and the heat dissipation tube has a length enabling the reflected sound wave and the noise to have a phase difference of 180 degrees.

In an embodiment, the heat dissipation tube is a T-shaped tube including a vertical portion and a horizontal portion; the vertical portion communicates with the sound outlet and the horizontal portion; the noise is substantially reflected from the horizontal portion to form the reflected sound wave.

In an embodiment, the heat dissipation tube includes a plurality of linear tubing portions arranged side by side; ends of the plurality of linear tubing portions are alternately connected, so the plurality of linear tubing portions communicate with each other; a total length of the plurality of linear tubing portions is substantially the length of the heat dissipation tube and is one quarter of a wavelength of the noise.

In an embodiment, the plurality of linear tubing portions are arranged side by side along an outer surface of the optical engine housing or along a normal to the outer surface.

In an embodiment, the optical engine module further includes a plurality of the heat dissipation tubes, wherein the plurality of heat dissipation tubes are different in length to form a plurality of the reflected sound waves, and the plurality of reflected sound waves correspond to the noises of different wavelengths.

In an embodiment, the light modulation unit includes a color wheel, an actuator, or a combination thereof.

In another embodiment, the invention provides a projector including the optical engine module described above to not only dissipate heat but also reduce noise by the particular length design of the heat dissipation tube.

In an embodiment, the projector of the invention includes a light source module configured to provide light and the optical engine module described above, wherein the optical engine housing having a light inlet and a light outlet; the light enters the optical engine module from the light inlet; the optical engine module modulates the light to a modulated light, and the modulated light is emitted out from the light outlet.

In an embodiment, the projector further includes an image-forming component, wherein the light modulation unit includes an actuator disposed corresponding to the image-forming component to guide the light from the light outlet to a first location or a second location of the image-forming component to form the modulated light, and the image-forming component modulates the modulated light to an optical signal according to an image signal.

In an embodiment, the projector further includes an image-forming component, wherein the light modulation unit includes an actuator and a color wheel; the color wheel is rotated to form the modulated light by changing color of the light according to an image signal; the actuator guides the modulated light from the light outlet to a first location or a second location of the image-forming component to form the modulated light, and the image-forming component modulates the modulated light to an optical signal according to the image signal.

In an embodiment, the actuator comprises a frame and a lens movably disposed on the frame; the lens moves relative to the frame to have a first inclined angle or a second inclined angle with respect to the frame, so that the modulated light is guided to the first location or the second location of the image-forming component.

In an embodiment, the projector further includes an image-forming component, wherein the light modulation unit includes a color wheel; the color wheel is rotated to form the modulated light by changing color of the light according to an image signal, and the image-forming component modulates the modulated light to an optical signal according to the image signal.

Compared to the prior art, the optical engine module and the projector of the invention utilizing the design of the heat dissipation tube can not only dissipate heat from the optical engine module to outside the housing, but also reduce noises generated during operation of the elements of the optical engine module without influencing heat dissipation, to achieve the heat dissipation and noise reduction at the same time.

BRIEF DESCRIPTION OF THE DRAWINGS

FIGS. 3A to 3D are schematic views showing operations of the actuator in an embodiment of the invention.

DETAILED DESCRIPTION OF THE PREFERRED EMBODIMENT

The invention provides an optical engine module, particularly an optical engine module which integrates heat dissipation and noise reduction through a heat dissipation tube. The optical engine module of the invention can be applied to a projecting device, and thus the invention further provides a projector having the optical engine module to achieve heat dissipation, and at the same time reduce noise and improve operation quality. Hereinafter, embodiments of the optical engine module and the projector of the invention will be described in detail with reference to the drawings.

Figure 1:
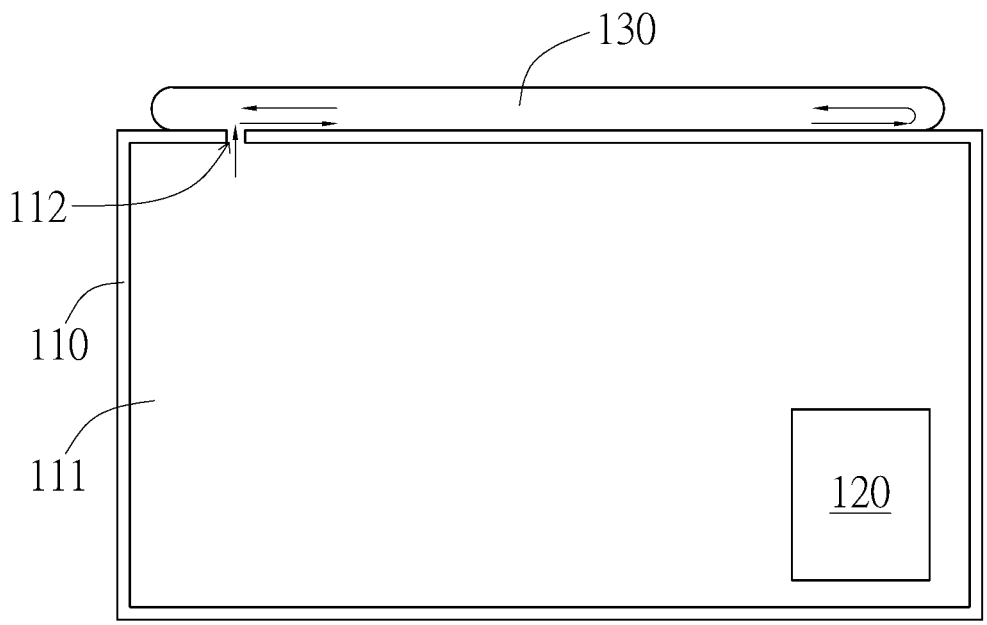
FIG. 1 is a schematic view of an embodiment of the optical engine module of the invention.

As shown in FIG. 1, in an embodiment, the optical engine module 100 includes an optical engine housing 110, a light modulation unit 120, and a heat dissipation tube 130. The optical engine housing 110 has a sound outlet 112. The light modulation unit 120 is disposed in the optical engine housing 110. The heat dissipation tube 120 is disposed on the optical engine housing 110 at an outer side of the optical engine housing 110. The heat dissipation tube 130 communicates with the sound outlet 112. The heat dissipation tube 130 is configured to dissipate heat from the optical engine housing 110. Noise is generated when the light modulation unit 120 is operated. The noise travels from the sound outlet 112 into the heat dissipation tube 130 and is reflected back through the heat dissipation tube 130 to the sound outlet 112 to form a reflected sound wave, and the heat dissipation tube 130 has a length enabling the reflected sound wave and the noise to have a phase difference of 180 degrees.

Specifically, the optical engine housing 110 can be made of metal materials as a housing enclosing an accommodation space 111. The accommodation space 111 is configured to accommodate functional components of the optical engine module 100, such as light modulation unit 120, lens, reflective mirrors, etc., to achieve a desired optical performance. In this embodiment, the sound outlet 112 is formed on the optical engine housing 110 corresponding to the heat dissipation tube 130, and the number and diameter of the sound outlet 112 can be varied with the arrangement of the heat dissipation tube 130. In an embodiment, the sound outlet 112 can be a through hole formed on the housing wall of the optical engine housing 110 to communicate with the accommodation space 111 and the heat dissipation tube 130.

Figure 2A:
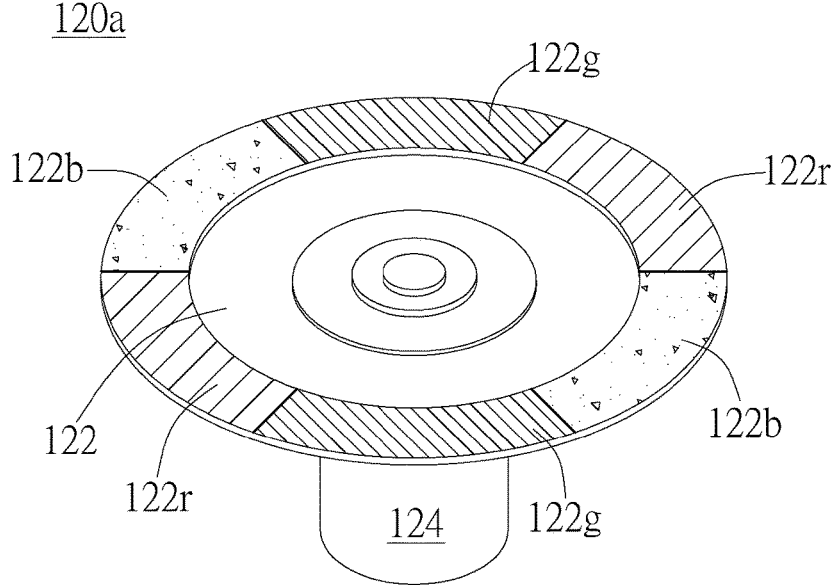
FIG. 2A is a schematic view of the light modulation unit embodied as a color wheel in an embodiment of the invention.

The light modulation unit 120 can be a functional component disposed inside the optical engine housing 110 and configured to modulate light. Noise is generated due to operation of the light modulation unit 120. For example, rotation of the light modulation unit 120 causes air to flow, so that noise is generated, or noise is generated due to vibration caused by rotation (or movement) of the light modulation unit 120. The light modulation unit 120 can be, for example, a color wheel 120a, an actuator 120b, or a combination thereof, but not limited thereto. The actuator can be an extended pixel resolution actuator (XPR). As shown in FIG. 2A, in an embodiment, the color wheel 120a includes wheel plate 122 and a driving device 124. The wheel plate 122 includes at least a color-changing region, such as color-changing regions 122r, 122g, 122b, which are covered with color-changing materials. The color-changing regions 122r, 122g, 122b are configured to generate light of corresponding colors, such as red light, green light, blue light. The wheel plate 122 can be a circular carrier plate, and the color-changing regions 122r, 122g, 122b can be fan-shaped regions arranged along the circumferential direction of the wheel plate 122. In this embodiment, the color-changing material may include materials which are excited by light source to generate light of corresponding color, such as phosphor powders, quantum dots, but not limited thereto. The shape, number, size, and arrangement of the color-changing regions 122r, 122g, 122b can be modified according to practical applications. The driving device 124 is connected to the wheel plate 122. The driving device 124 can rotate the wheel plate 122 according to the image signal, so that the color-changing regions 122r, 122g, 122b, corresponding to the light emitted from the light source, changes the color of light to achieve a beam-splitting effect. In an embodiment, the driving device 124 can a motor pivotally connected to the wheel plate 122 to rotate the wheel plate 122.

Figure 2B:
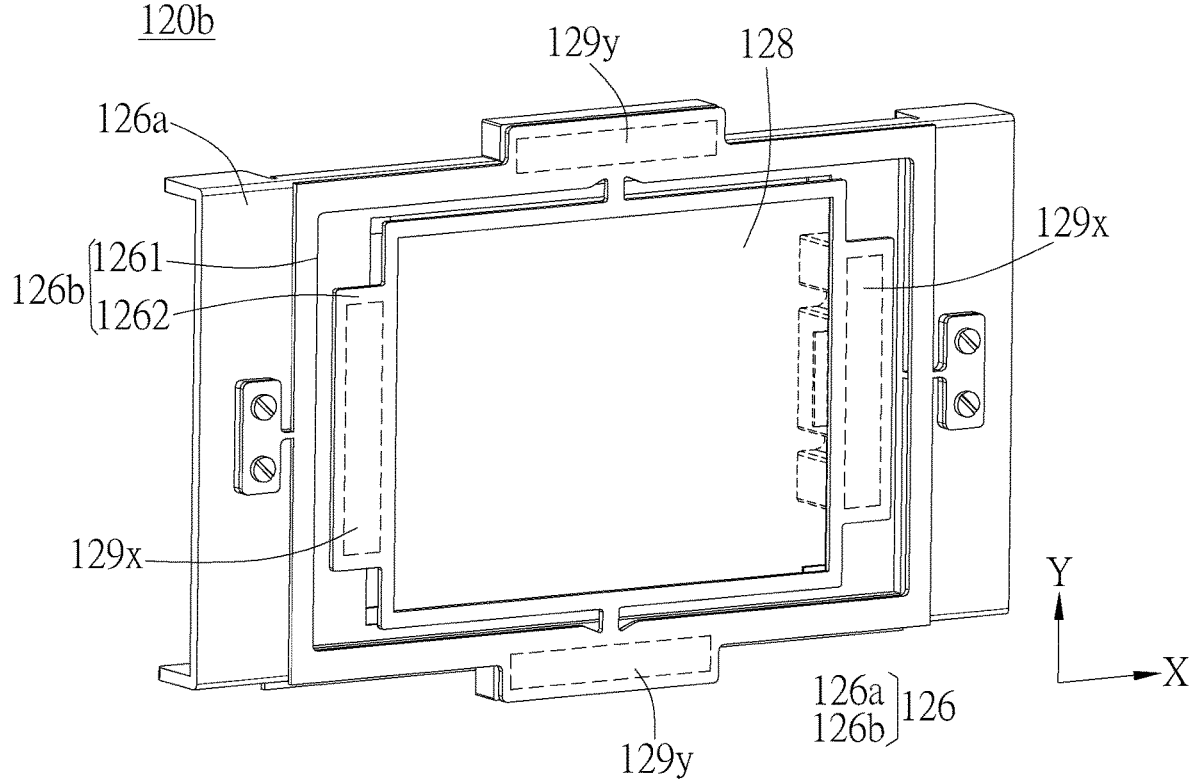
FIG. 2B is a schematic view of the light modulation unit embodied as an actuator in an embodiment of the invention.

As shown in FIG. 2B, in an embodiment, the actuator 120b includes a frame 126 and a lens 128. The lens 128 is movably disposed on the frame 126. The lens 128 moves relative to the frame 126 to have a first inclined angle or a second inclined angle with respect to the frame 126, so that the light incident onto the lens 128 is guided to different locations (or optical paths). Specifically, the frame 128 may include a frame body 126a and a lens carrier 126b. The frame body 126a is provided with a driving mechanism, which is configured to drive the lens 128 to move relative to the frame body 126a and changes the inclined angle of the lens 128 with respect to the frame body 126a. In an embodiment, the driving mechanism can be embodied as electromagnets, such as 129x, 129y. The lens carrier 126b is partially connected to the frame body 126a, so that by controlling the driving mechanism, the lens carrier 126b can move (or deform) in one dimension or two dimensions, such as X axis direction, Y axis direction or both X axis and Y axis directions, with respect to the frame body 126a, to change the inclined angle of the lens 128 with respect to the frame body 126a.

In this embodiment, the lens carrier 126b is preferably in form of two frames, wherein the outer frame 1261 is partially connected to the frame body 126a at two sides along the X axis direction, while the inner frame 1262 is disposed on the inner side of the outer frame 1261 and partially connected to the outer frame 1261 at two sides along the Y axis direction. The lens 128 is disposed on the inner frame 1262. Two sets of electromagnets 129x, 129y are disposed on the frame body 126a at two opposite sides of the X axis direction and the Y axis direction corresponding to the locations where the outer frame 1261 and the frame body 126a are partially connected and where the inner frame 1262 and the outer frame 1261 are partially connected. As shown in FIGS. 3A to 3D, by controlling the electromagnets 129x, 129y, the actuator 120b enables the outer frame 1261 and/or the inner frame 1262 is enabled to rotate (or deform) with respect to the frame body 126a, so that the lens 128 can have different inclined angles with respect to the frame body 126a to project the light, which is incident onto the lens 128, to four different locations A, B, C, D in two dimensions, such as X axis direction and Y axis direction.

The heat dissipation tube 130 is preferably a hollow tube made of heat dissipating materials, such as metals including aluminum, copper, iron, or alloys thereof. The heat dissipation tube 130 can be disposed on the outer surface of the optical engine housing 110 by welding, adhering, engaging, and configured to conduct heat from the optical engine housing 110 to outside of the optical engine housing 110. The heat dissipation tube 130 communicates with the sound outlet 112 of the optical engine housing 110, and the heat dissipation tube 130 is formed with an internal channel closed at the distal end. The noise generated due to the operation of the light modulation unit 120, for example rotation of the color wheel 122 or the movement of the lens 128, can enter the channel of the heat dissipation tube 130 from the sound outlet 112, propagate in the heat dissipation tube 130 and be reflected back to the sound outlet 112 to form the reflected sound wave. The reflected sound wave and the noise preferably have a phase difference of 180 degrees in wavelength, so that the reflected sound wave and the noise can cancel each other out, to achieve the noise reduction effect. In other words, the length of the heat dissipation tube 130 is designed according to the wavelength of noise which is to be cancelled, so that the reflected sound wave, which is reflected from the heat dissipation tube 130 back to the sound outlet 112, and the noise have a phase difference of 180 degrees, so that noise reduction can be achieved. As shown in FIG. 1, when the heat dissipation tube 130 is a single linear tube, one end of the heat dissipation tube 130 is connected to and communicates with the sound outlet 112, and the length of the heat dissipation tube 130 is preferably one quarter of the wavelength of the noise to be cancelled. As such, the traveling distance of the noise entering the heat dissipation tube 130 from the sound outlet 112, propagating to the distal end of the heat dissipation tube 130 and being reflected back to the sound outlet 112 is half of the wavelength of the noise, so that the reflected sound wave and noise have a phase difference of 180 degrees to achieve the noise reduction, but not limited thereto. According to practical applications, the heat dissipation tube 130 may have different configurations.

As shown in FIG. 4A, in another embodiment, the heat dissipation tube 130' can be a T-shaped tube including a vertical portion 131 and a horizontal portion 132. The vertical portion 131 communicates with the sound outlet 112 and the horizontal portion 132. The noise is substantially reflected from the horizontal portion 132 to form the reflected sound wave. Specifically, in this embodiment, compared to the horizontal portion 132, the length of the vertical portion 131 of the heat dissipation tube 130' is negligible, and the noise is substantially reflected through the horizontal portion 132 to form the reflected sound wave. In other words, in this embodiment, the heat dissipation tube 130' is substantially connected to and communicates with the sound outlet 112 of the optical engine housing 110 at the middle section of the horizontal portion 132, so that noises entering the heat dissipation tube 130' will travel toward two ends of the horizontal portion 132 in multiple propagation paths. Accordingly, the reflected sound wave which is reflected back to the sound outlet 112 will have multiple wavelengths in the phase difference of 180 degrees from the noise, so that the reflected sound wave and the noise can cancel each other out to achieve the noise reduction.

Figure 5A:
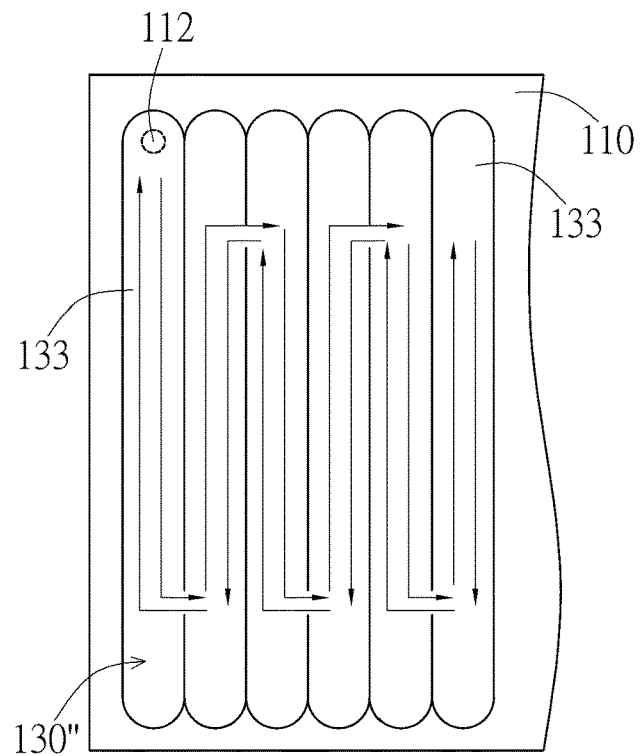
Figure 5B:
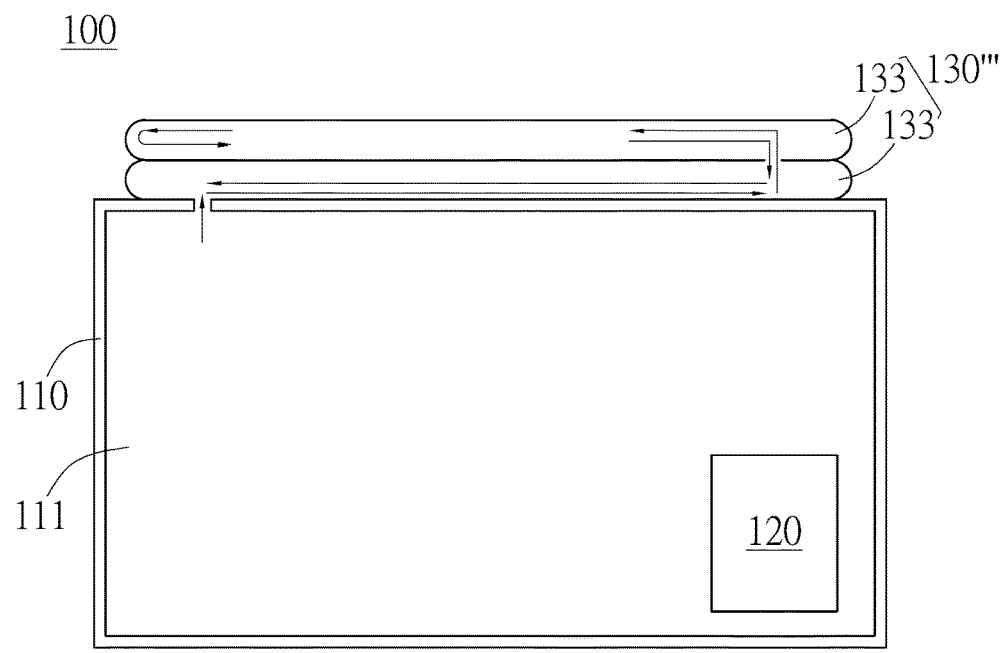

As shown in FIGS. 5A and 5B, in another embodiment, the heat dissipation tube 130" includes a plurality of linear tubing portions 133. The linear tubing portions 133 are arranged side by side, and ends of the plurality of linear tubing portions 133 are alternately connected, so the plurality of linear tubing portions 133 communicate with each other, and the heat dissipation tube 130" has an internal zigzag channel. The total length of the plurality of linear tubing portions 133 is substantially the length of the heat dissipation tube 130", so that the reflected sound wave, which is reflected back to the sound outlet 112, and the noise have a phase difference of 180 degrees to achieve the noise reduction. For example, the total length of the plurality of linear tubing portions 133 and is preferably one quarter of the wavelength of the noise. Specifically, as shown in FIG. 5A, in this embodiment, the plurality of linear tubing portions 133 are arranged side by side along an outer surface of the optical engine housing 110, and ends of the plurality of linear tubing portions 133 are alternately connected. Preferably, the plurality of linear tubing portions 133 are disposed parallel to one another along the outer surface of the optical engine housing 110, and ends of adjacent linear tubing portions 133 are alternately connected to form the continuous heat dissipation tube 130" distributed on the outer surface of the optical engine housing 110. As such, the space required for arranging the heat dissipation tube in a single dimension can be effectively reduced.

As shown in FIG. 5B, in this embodiment, the plurality of linear tubing portions 133 are arranged along a normal to the outer surface of the optical engine housing 110, and ends of the plurality of linear tubing portions 133 are alternately connected. In other words, the plurality of linear tubing portions 133 are stacked on each other on the outer surface of the optical engine housing 110, and ends of the plurality of linear tubing portions 133 are alternately connected to form the continues heat dissipation tube 130''', which is bent outward in a direction away from the optical engine housing 110. As such, the space required for arranging the heat dissipation tube in a single dimension can be effectively reduced, and the outer surface of the optical engine housing 110 can accommodate more heat dissipation tubes of different lengths, so that noises of different wavelengths can be correspondingly cancelled. For example, in the embodiment of FIG. 5B, when the heat dissipation tube 130''' consists of two linear tubing portions 133, the total length of the two linear tubing portions 133 is substantially equal to the length of a single linear heat dissipation tube, such as 130. By such a design, each linear tubing portion can have a length shorter than a single heat dissipation tube, such as half of the length of the heat dissipation tube 130, i.e., one eighth of wavelength of the noise, to effectively reduce the space required for arranging the heat dissipation tube in a single dimension. It is noted that when the heat dissipation tube consists of multiple linear tubing portions, the number and the length of the linear tubing portions can be modified according to practical application and not limited to the embodiments.

Figure 6:
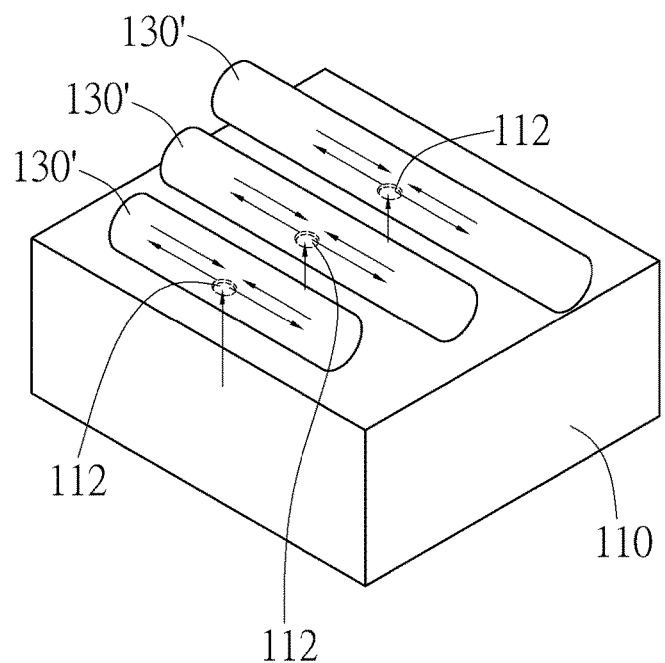

As shown in FIG. 6, in another embodiment, the optical engine module 100 may include a plurality of the heat dissipation tubes 130'. The plurality of heat dissipation tubes 130' are different in length to form a plurality of the reflected sound waves, and the plurality of reflected sound waves correspond to the noises of different wavelengths. In this embodiment, in order to reduce noises of different frequencies, the length of the heat dissipation tubes can be designed corresponding to noises of different frequencies. For example, a plurality of T-shaped heat dissipation tubes 130' of different lengths and different calibers (i.e., the inner diameter of tube) can be used to reduce noises of different frequencies for a better noise reduction effect, but not limited thereto. In another embodiment, the plurality of heat dissipation tubes may include, for example, one or more of the single linear type heat dissipation tube 130, the T-shaped heat dissipation tube 130', the side by side arranged heat dissipation tube 130", the stacked heat dissipation tube 130''', or the combinations thereof, and the number and the length of each type heat dissipation tube can be modified according to practical applications and not limited to the embodiments.

Figure 7:
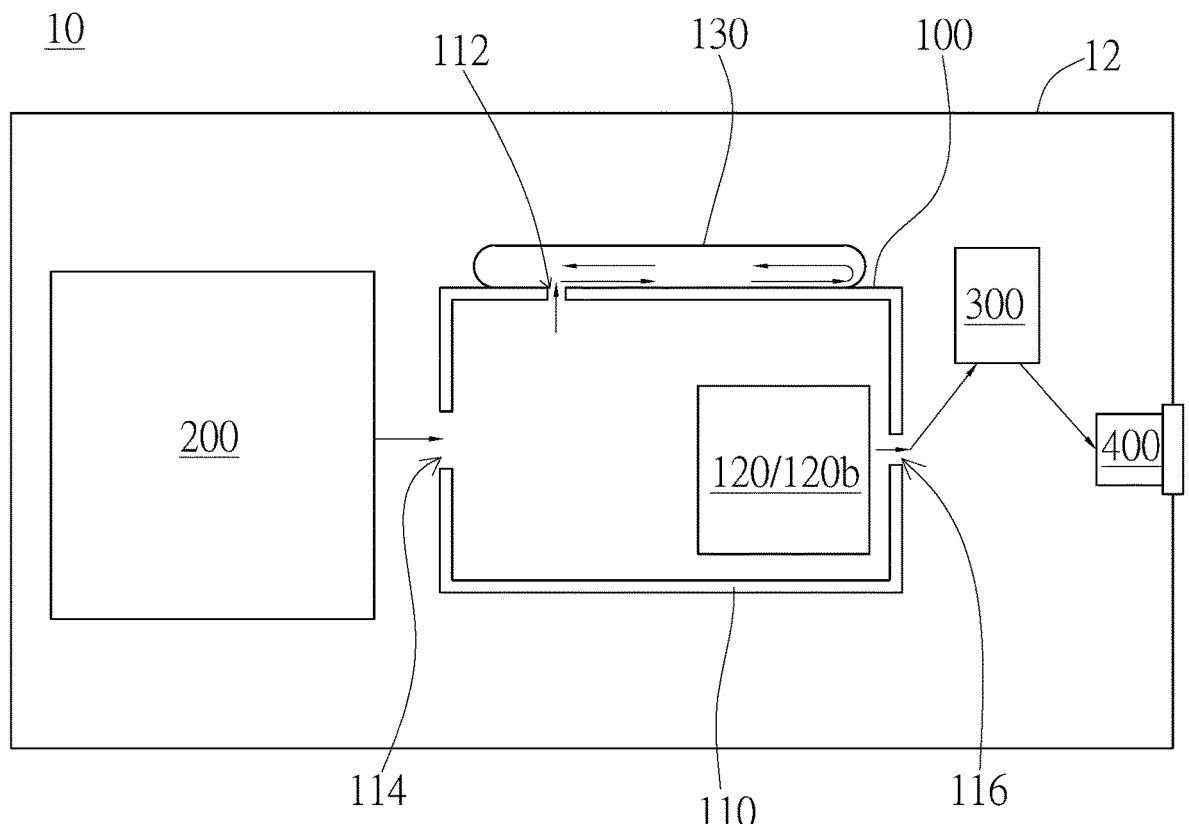
FIG. 7 is a schematic view of the projector in an embodiment of the invention.

As shown in FIG. 7, in another embodiment, the projector 10 of the invention includes a light source module 200 and an optical engine module 100. The light source module 200 is configured to provide light, and the optical engine module 100 can be an optical engine module having a structure shown in any of the embodiments of FIG. 1 and FIGS. 4 to 6. In this embodiment, the optical engine housing 110 of the optical engine module 100 further has a light inlet 114 and a light outlet 116. Light transparent units, such as glass plates or prisms, can be disposed on the light inlet 114 and the light outlet 116 to prevent dusts or contaminants from entering the accommodation space 111. Light enters the optical engine housing 100 from the light inlet 114. The optical engine module 100 modulates the light to a modulated light, and the modulated light is emitted out from the light outlet 116. In addition, the projector 10 further includes a projector housing 12, an image-forming component 300, and a lens 400. The projector housing 12 is configured to accommodate functional components of the projector 10, such as the light source module 200, the optical engine module 100, the image-forming component 300, and the like. The light source module 200 is disposed corresponding to the optical engine module 100, so that light emitted from the light source module 200 can enter the optical engine module 100 from the light inlet 114 of the optical engine housing 110. The image-forming component 300 is configured to modulate the modulated light to an optical signal, and the lens 400 is disposed corresponding to the image-forming component 300 to project the optical signal out of the projector housing 12 to form an image.

Specifically, in an embodiment, the light source module 200 may include a plurality of light-emitting elements. In this embodiment, the light-emitting elements are preferably light-emitting diodes (or laser diodes), which respectively emit red, green, and blue lights, but not limited thereto. In another embodiment, the light-emitting elements may be light-emitting diodes (or laser diodes), which emit white light or light of other colors (or wavelengths). In an embodiment, the sound outlet 112 is preferably disposed on a different side of the optical engine housing 110 from the light inlet 114 and the light outlet 116 to facilitate the arrangement of the heat dissipation tube 130, but not limited thereto. In another embodiment, the sound outlet 112 can be disposed on the same side of the optical engine housing 110 as the light inlet 114 and the light outlet 116.

In this embodiment, the image-forming component 300 is preferably disposed outside the optical engine housing 110 corresponding to the light outlet 116 of the optical engine module 100. The light modulation unit 120 of the optical engine module 100 may include an actuator, such as the actuator 120b of FIG. 2B, but not limited thereto. In another embodiment (not shown), the light modulation unit 120 may include a color wheel, such as color wheel 120a of FIG. 2A, or a combination of an actuator and a color wheel. The actuator 120b guides the light from the light outlet 116 to a first location or a second location of the image-forming component 300. For example, the image-forming component 300 includes a digital micromirror device, which is constructed by a plurality of micromirrors and selectively reflects light into an optical signal according to an image signal. The actuator 120b is disposed at the upstream of the image-forming component 300 in the optical path. The inclined angle of the lens 128 with respect to the frame 126, such as the first inclined angle or the second inclined angle, is controlled based on the image signal, so that the light emitted out from the light outlet 116 of the optical engine module 100 is guided to the first position or the second position of the micromirrors of the image-forming component 300. The image-forming component 300 controls the micromirrors according to the image signal to selectively reflect the light into the optical signal, which is projected to a screen or a wall by the lens 400 to form an image.

It is noted referring to the operation of the actuator 120b described above, the actuator 120b can selectively guide a pixel light to different locations of a same micromirror of the image-forming component 300, such as the four locations A, B, C, and D in FIG. 3D, so that the resolution of the projector can be promoted without increasing the number of micromirrors of the image-forming component 300. For example, in a single dimension, such as X axis or Y axis, the resolution can be increased by two times, or in two dimensions, such as both X axis and Y axis, the resolution can be increased by two times in each dimension, facilitating the 4K ultra high definition (4K UHD) projection applications, but limited thereto.

In the above embodiment, the image-forming component 300 is disposed outside the optical engine housing 110 of the optical engine module 100, but not limited thereto. According to practical applications, the image-forming component 300 can be integrated to the optical engine module 100. In other words, in another embodiment, the optical engine module may include the image-forming component 300, and the image-forming component 300 is disposed inside the optical engine housing 110 at the downstream of the light modulation unit 120 (e.g., the color wheel 120a and/or the actuator 120b) in the optical path.

Figure 4:
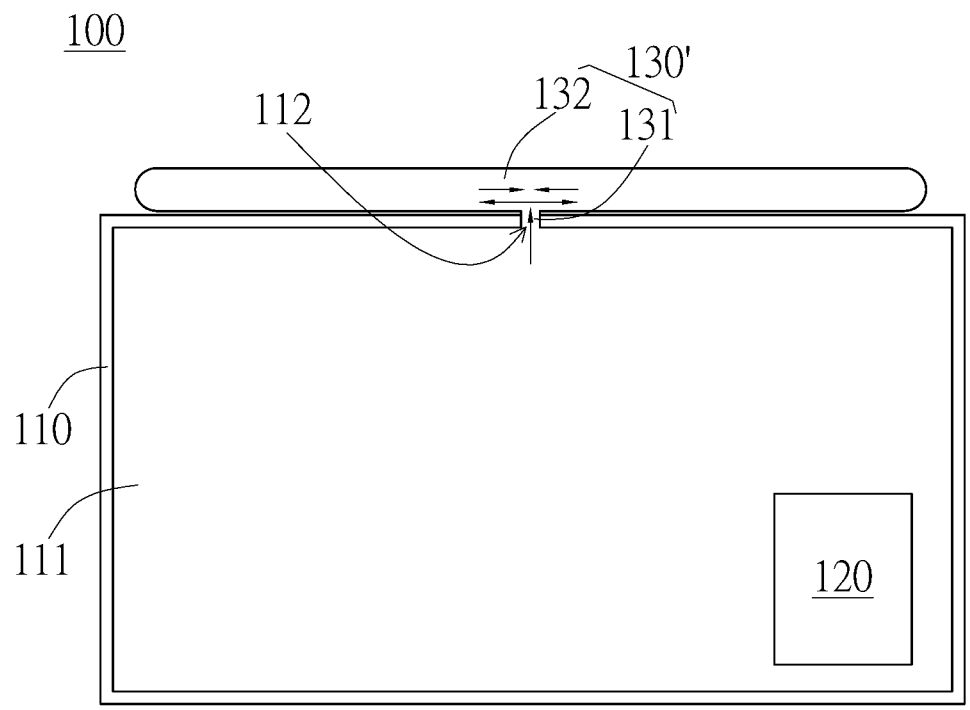
FIGS. 4, 5A, 5B, and 6 are schematic views of the optical engine module with the heat dissipation tube in different arrangements.

The projector 10 of the invention designed with the heat dissipation tube of the optical engine module 100 as shown in embodiments of FIGS. 1, 4, and 6 can not only dissipate heat of the optical engine module 10 outside the optical engine housing 110 and further dissipate heat to outside the projector housing 12 through the system heat dissipation design of the projector 10, but also reduce noises generated during operation of the elements in the optical engine module 100, to achieve the heat dissipation and noise reduction at the same time, promoting the operation quality of the projector.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. An optical engine module for a projector, comprising:
   an optical engine housing having a sound outlet;
   a light modulation unit disposed in the optical engine housing; and
   a heat dissipation tube disposed on the optical engine housing at an outer side of the optical engine housing and configured to dissipate heat from the optical engine housing, the heat dissipation tube communicating with the sound outlet, wherein noise is generated when the light modulation unit is operated; the noise travels from the sound outlet into the heat dissipation tube and is reflected back through the heat dissipation tube to the sound outlet to form a reflected sound wave, and the heat dissipation tube has a length enabling the reflected sound wave and the noise to have a phase difference of 180 degrees.

2. The optical engine module of claim 1, wherein the heat dissipation tube is a T-shaped tube comprising a vertical portion and a horizontal portion; the vertical portion communicates with the sound outlet and the horizontal portion; the noise is substantially reflected from the horizontal portion to form the reflected sound wave.

3. The optical engine module of claim 1, wherein the heat dissipation tube comprises a plurality of linear tubing portions arranged side by side, ends of the plurality of linear tubing portions are alternately connected, so the plurality of linear tubing portions communicate with each other; a total length of the plurality of linear tubing portions is substantially the length of the heat dissipation tube and is one quarter of a wavelength of the noise.

4. The optical engine module of claim 3, wherein the plurality of linear tubing portions are arranged side by side along an outer surface of the optical engine housing or along a normal to the outer surface.

5. The optical engine module of claim 1, further comprising a plurality of the heat dissipation tubes, wherein the plurality of heat dissipation tubes are different in length to form a plurality of the reflected sound waves, and the plurality of reflected sound waves correspond to the noises of different wavelengths.

6. The optical engine module of claim 1, wherein the light modulation unit comprises a color wheel, an actuator, or a combination thereof.

7. A projector, comprising:
a light source module configured to provide light; and
the optical engine module of claim 1, the optical engine housing having a light inlet and a light outlet,
wherein the light enters the optical engine module from the light inlet; the optical engine module modulates the light to a modulated light, and the modulated light is emitted out from the light outlet.

8. The projector of claim 7, further comprising an image-forming component, wherein the light modulation unit comprises an actuator disposed corresponding to the image-forming component to guide the light from the light outlet to a first location or a second location of the image-forming component to form the modulated light, and the image-forming component modulates the modulated light to an optical signal according to an image signal.

9. The projector of claim 7, further comprising an image-forming component, wherein the light modulation unit comprises an actuator and a color wheel; the color wheel is rotated to form the modulated light by changing color of the light according to an image signal; the actuator guides the modulated light from the light outlet to a first location or a second location of the image-forming component to form the modulated light, and the image-forming component modulates the modulated light to an optical signal according to the image signal.

10. The projector of claim 9, wherein the actuator comprises a frame and a lens movably disposed on the frame; the lens moves relative to the frame to have a first inclined angle or a second inclined angle with respect to the frame, so that the modulated light is guided to the first location or the second location of the image-forming component.

11. The projector of claim 7, further comprising an image-forming component, wherein the light modulation unit comprises a color wheel; the color wheel is rotated to form the modulated light by changing color of the light according to an image signal, and the image-forming component modulates the modulated light to an optical signal according to the image signal.

12. The projector of claim 8, wherein the actuator comprises a frame and a lens movably disposed on the frame; the lens moves relative to the frame to have a first inclined angle or a second inclined angle with respect to the frame, so that the modulated light is guided to the first location or the second location of the image-forming component.

* * * * *